March 13, 1956  R. B. KING  2,738,002
JACK ACTUATED TIRE CHANGING APPARATUS
Filed March 14, 1952  2 Sheets-Sheet 1

INVENTOR.
Ralph B. King
BY
Wayland D. Keith
HIS AGENT

March 13, 1956 R. B. KING 2,738,002
JACK ACTUATED TIRE CHANGING APPARATUS
Filed March 14, 1952 2 Sheets-Sheet 2
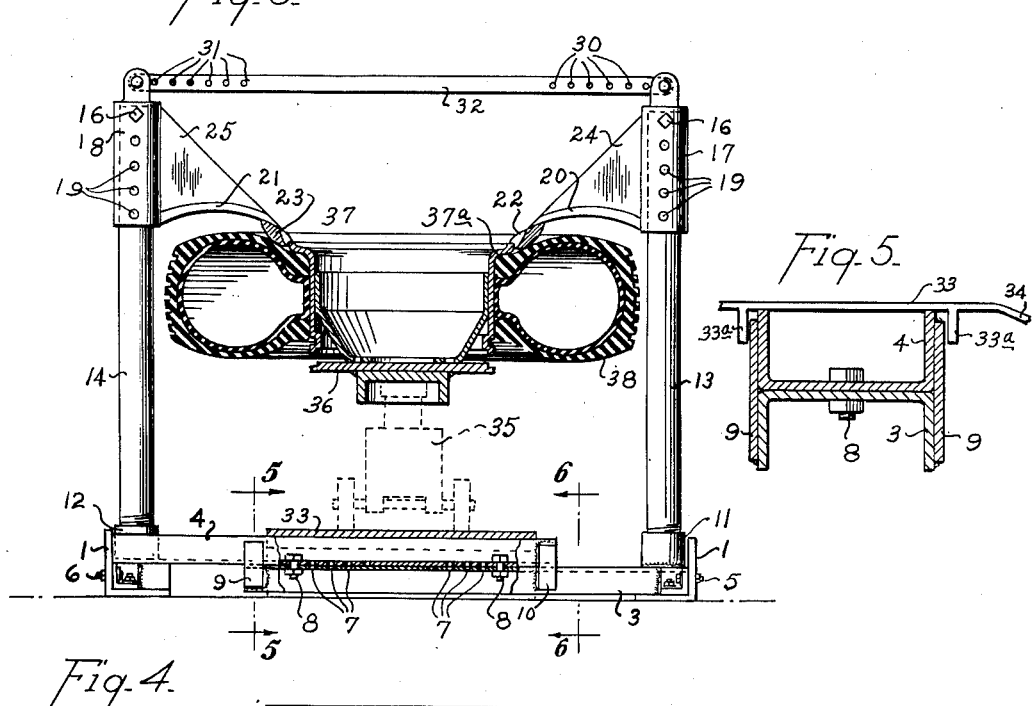
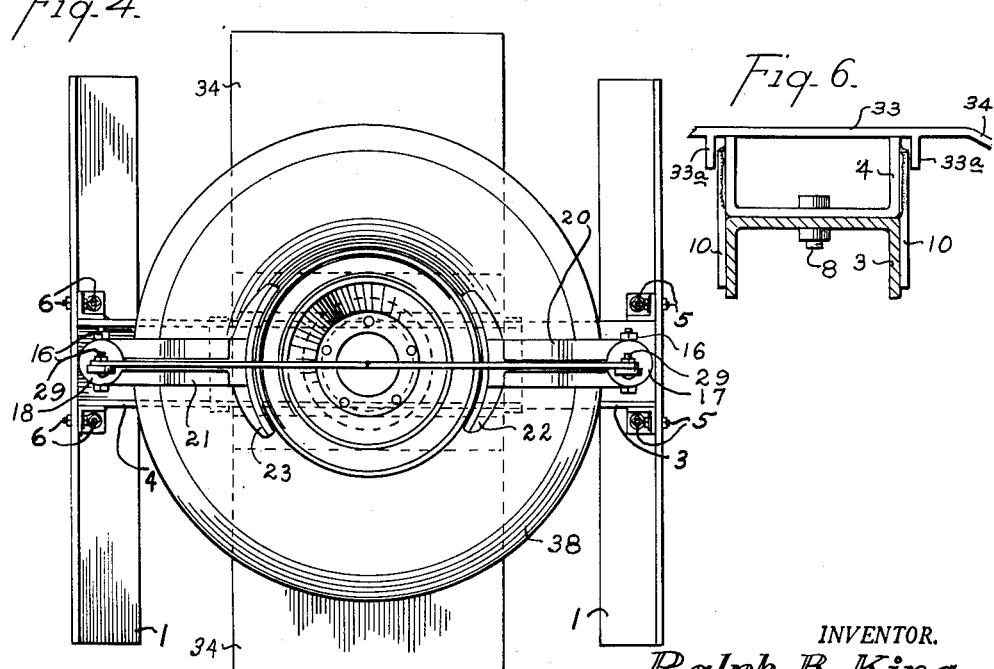
INVENTOR.
Ralph B. King
BY
Wayland D. Keith
HIS AGENT United States Patent Office 2,738,002
Patented Mar. 13, 1956

2,738,002

JACK ACTUATED TIRE CHANGING APPARATUS

Ralph B. King, Wichita Falls, Tex., assignor to Edward L. Bond, Wichita Falls, Tex.

Application March 14, 1952, Serial No. 276,548

3 Claims. (Cl. 157—1.2)

This invention relates to new and novel tire changing machines and more particularly to tire changing machines for removing truck casings and other large type tires from cylindrical rims that utilize a lock ring on one side. The removal of tires such as used on trucks, buses, and large industrial machinery often is very difficult, as is the replacing of these tires on the rims. Heretofore the procedure in removing from and replacing these tires on the rims was often by the use of manual tools such as hammers and pry bars, and since these rims are usually made of steel the inner surface quite often becomes rusty, which makes transverse slippage of the tire relative to the rim quite difficult.

The present device is so designed that it may be adjusted to fit various diameter tires and hydraulic or mechanical pressure is so applied that the tire may either be removed from the rim or forced thereonto by hydraulic or mechanical force. The apparatus is so designed that an auxiliary hydraulic unit such as a hydraulic wheeled jack may be used of the character that is used around filling stations, tire repair stations, and garages; therefore the present device may be built with less expense than devices in which a jack unit, such as a hydraulic jack, is built thereinto as a permanent unit.

An object of this invention is to provide a device that will readily mount or demount pneumatic tires onto or off of cylindrical rims.

Another object of this invention is to provide a device that is readily adjustable to fit casings of various sizes and diameters.

A still further object of this invention is to provide a device that may be readily disassembled and reassembled.

A still further object of this invention is to provide a tire changing device that is rugged in construction, simple in operation, and with which a standard jack may be used.

A still further object of this invention is to provide a device that is simple in construction, easy to operate, inexpensive to manufacture, and dependable in use.

An embodiment of this invention is shown in the accompanying drawings, in which:

Fig. 3 is an end elevational view of the device embodying the invention, with parts shown in section and parts broken away, and showing a jack in dash outline disposed below the wheel on which the casing is positioned;

Fig. 4 is a top plan view of the invention, showing a tire in place thereon;

Fig. 5 is a section taken on line 5—5 of Fig. 3 looking in the direction indicated by the arrows, showing a portion of the framework, adjusting bolts, and a bedplate to receive a jack; and Fig. 6 is a view similar to Fig. 5, but taken on line 6—6 of Fig. 3, looking in the opposite direction to that of Fig. 5.

Figure 1:
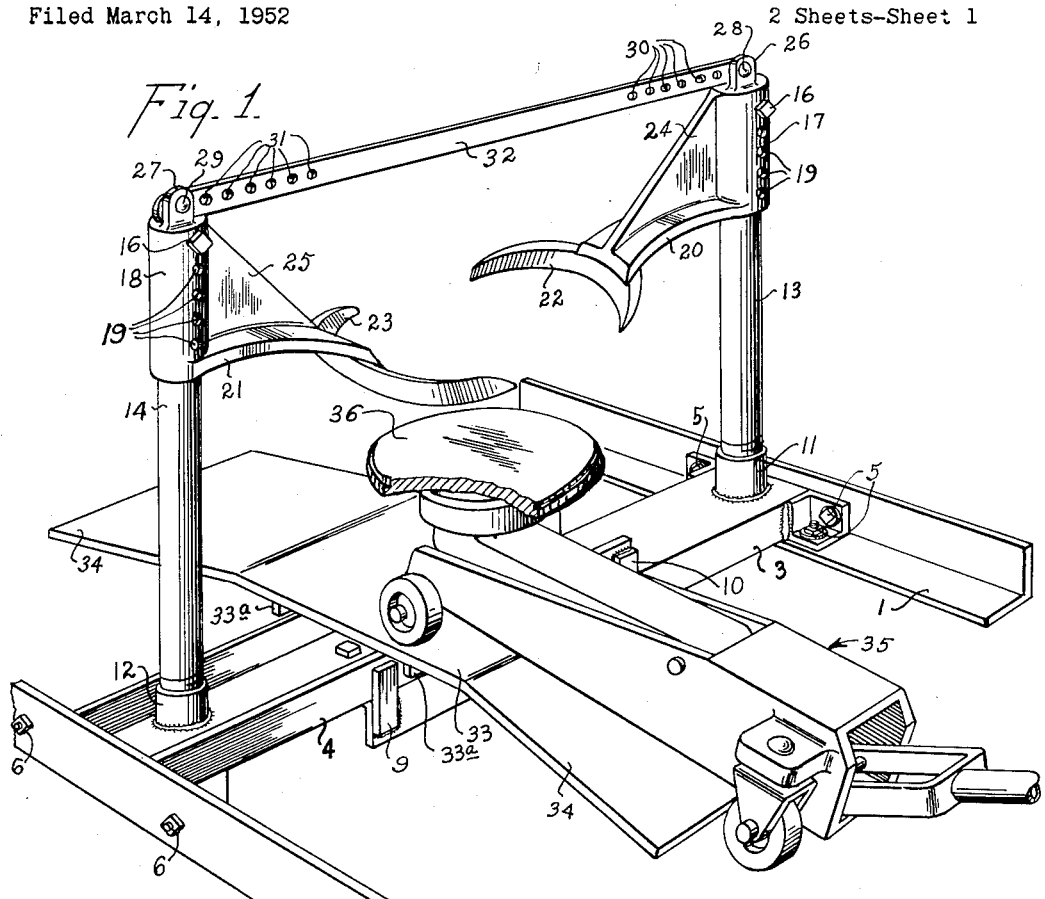
Fig. 1 is a perspective view of the device with parts broken away and shown in section to show the details of construction.

With more detailed reference to the drawing, the numeral 1 designates angle base members to which channel members 3 and 4 are secured by bolts 5 and 6, respectively. The channel member 3 has downwardly protruding flanges so as to present a flat upper surface, while the channel 4 has upstanding flanges so as to present a smooth lower surface so the webs of the two channels may be bolted together, as shown in Figs. 3, 5, and 6.

The webs of the channels have spaced apertures 7 which are adapted to receive bolts 8 to enable relative longitudinal adjustment between the channel members 3 and 4.

The channel member 3 has upstanding lugs 9 secured at the inner end as by welding to form a guide with respect to channel 4. While the channel 4 has downwardly extended lugs 10 welded to the inner end of channel 4 so as to provide relative guided movement between channel 4 and channel 3. These channels have upstanding screw threaded collars 11 and 12 welded near their outer ends, in which screw threaded standards 13 and 14, respectively, are fitted. The standards 13 and 14 each have a transverse hole 15 through their upper ends, preferably parallel to frame members 1, through which bolts 16 pass. Cap members 17 and 18 are positioned on top of standards 13 and 14, and each has a series of holes 19 which are adapted to register with the respective holes 15 as the cap members are raised or lowered with respect to hole 15, so as to enable the bolt 16 to pass therethrough to lock the cap members 17 and 18 with respect to the standards 13 and 14. The cap members have outstanding arms 20 and 21 that have arcuate members 22 and 23 secured to the inner end thereof. The arms 20 and 21 may be braced by web braces 24 and 25, as will best be seen in Fig. 1. The upper ends of the cap members 17 and 18 have lugs 26 and 27 on their respective upper ends, each of which is apertured to receive bolts 28 and 29 respectively, each of which bolts are adapted to pass therethrough and through one of the holes 30 or 31 respectively formed in bar 32.

A jack base plate 33 is removably positioned across channels 3 and 4 to form a bridge and has upwardly and inwardly sloping approaches 34 so a jack generally designated by the numeral 35 may be used from either side of the device. The base plate 33 has downwardly extending lugs 33a positioned on each side of channel member 4 so as to prevent relative movement between the jack base plate 33 and the channel members when rolling the jack on to and off of the base plate. The jack 35 may be either mechanically or hydraulically operated and of the general character known as a wheeled jack, such as used around garages, tire stations, and the like; however it is to be understood that any type of jack to apply the pressure to the wheel or rim may be used equally as well. A wheel engaging member 36 is adapted to be placed on the upper end or ram of the jack so as to cause movement of the wheel generally designated by the numeral 37 to move the tire 38 with respect thereto.

Figure 2:
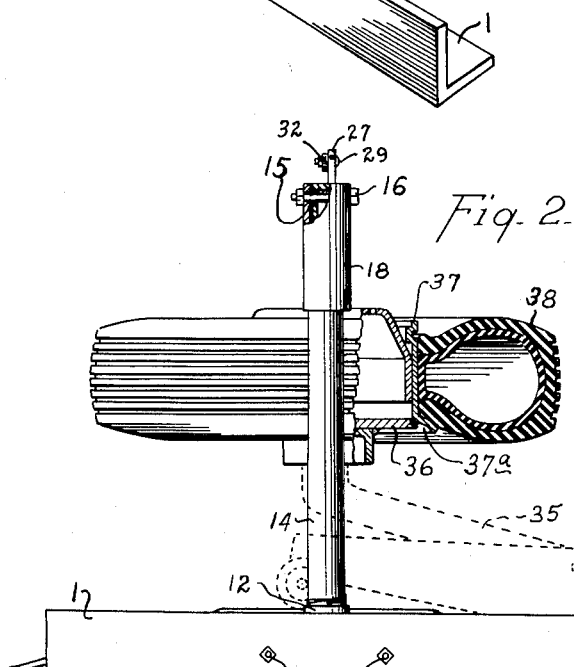
Fig. 2 shows a side elevational view of the device and showing a casing thereon, partly in elevation and partly in section, and showing a jack interposed between the wheel and the bedplate of the tire changing device.

The tire 38 may be either removed from the rim of the wheel 37 or forced thereunto as desired without the use of special accessories. As shown in Fig. 2, the wheel 37 is being forced upward into tire 38 by jack 35, as the arcuate members 22 and 23 surround the rim of the wheel 37 so as to engage the tire 38 and restrain the tire against upward movement as the wheel 37 is jacked into place into the tire by jack 35. The wheel engaging member 36 fits within the wheel 37 so as to center the wheel and move the wheel upward upon application of pressure thereto by jack 35.

To remove the tire 38 from the rim of the wheel 37, the arms 20 and 21 are so adjusted that the arcuate members 22 and 23 surround the out-turned flange 37a of wheel 37 as shown in Fig. 3, and with the wheel arranged in inverse position to that shown in Fig. 2 and with the wheel engaging member 36 abutting the wheel or rim 37, the jack 35 is utilized to apply upward pressure which will cause the wheel 37 to be forced upward and with the arcuate members 22 and 23 restraining the tire 38 against upward movement, the wheel 37 will be jacked upward until disengaged from the tire 38.

The bar 32 has holes 30 and 31 to enable relative adjustment between arcuate members 22 and 23 so as to accommodate wheels of varying diameters, and while one size of the arcuate members 22 and 23 may be made to accommodate several wheel diameters, various arms 20 and 21 may be provided which are readily interchangeable so as to accommodate all sizes of tires and yheels. This is also true with respect to wheel engaging member 36.

By the removal of the various bolts and unscrewing the standards 13 and 14 from coliars 11 and 12, the device may be dismantled to enable the packing in a relatively small carton and any jack, whether hydraulic or mechanical and whether of a wheeled type or the vertical lift type, may be employed to apply pressure to wheel engaging member to operate the device.

While the invention has been described in some detail, it is to be understood that changes in construction may be made within the scope of the appended claims without departing from the spirit of the invention.

Having thus clearly shown and described the invention, what is claimed as new and desired to secure by Letters Patent is:

1. In an apparatus for demounting a tire from a wheel, a wheeled jack, a pair of horizontal channel members arranged with the web portions thereof in abutting relation, one above the other to form an elongated base, the uppermost of said channel members having downturned projections secured to each side thereof near the innermost end and overlapping said lowermost channel, and the lowermost channel having upturned projections secured on each side thereof near the innermost end and extending upward in overlapping relation with said uppermost channel, and means securing said channels in longitudinally adjusted relation, a pair of standards secured to and rising from said base, inwardly extending tire engaging arms mounted on said standards, a ramp bridging said base in position for said wheeled jack to be wheeled thereupon, which ramp has a substantially horizontal center portion positioned approximately below said inwardly extending arms to receive said wheeled jack, a wheel engaging member on said jack for moving said wheel relative to said arms.

2. In an apparatus for demounting a tire from a wheel, a wheeled jack, an elongated base, a pair of standards secured to and rising from said base, inwardly extending tire engaging arms adjustably mounted on said standards, a ramp bridging said base in position for said wheeled jack to be wheeled thereupon, said ramp having a substantially horizontal center portion positioned approximately below said inwardly extending arms to receive said wheeled jack, depending lugs secured to the bottom of said horizontal portion of said ramp on either side of said elongated base, immediately adjacent the respective sides of said base, and a wheel supporting member on said jack for supporting and moving said wheel relative to said arms.

3. In an apparatus for changing a pneumatic tire on a vehicle wheel, which apparatus is for use with a wheeled jack, a base comprising a pair of inversely arranged channel members, means for maintaining said members in longitudinally aligned relation, means holding said channel members in fixed relation, an angle member detachably secured at a right angle to the outer end of each of said base members, a socket rigidly secured to each of said channel members near the respective outer ends thereof, an upstanding standard secured in each of said sockets, a sleeve member telescopically fitted on the upper end of each of said standards and having a series of apertures formed therein for relative longitudinal adjustment of each of said sleeves with respect to the respective standards, said standards each having an aperture formed therein, one of said apertures of said series of apertures in each of said sleeves being adapted to selectively register with the aperture in each of said standards, pin means for interlocking each of said upstanding standards with the respective sleeve so as to maintain said sleeve in adjusted relation with respect thereto, an inwardly protruding arm secured to each of said sleeve members, said arms each having a member for engaging a tire, a bar extending between the upper ends of said sleeve members, means for detachably securing said bar to each of said sleeve members so as to maintain said standards in spaced vertical alignment, a plate member having the outer ends thereof sloping downwardly from said channel members and adapted to be positioned over said channel members to form a ramp for said wheel jack to be wheeled thereupon, and lug members secured to the underside of said plate member and adapted to engage the opposite sides of one of said channel members so as to prevent relative movement between said plate and said channel member, said wheeled jack being interposable between said plate and said arcuate members for supporting and moving said wheel relative to said arcuate members.

References Cited in the file of this patent

UNITED STATES PATENTS

| | | |
|---|---|---|
| 1,684,446 | Inglis | Sept. 18, 1928 |
| 2,362,061 | Ewing | Nov. 7, 1944 |
| 2,449,289 | Garey | Sept. 14, 1948 |
| 2,500,285 | Horton et al. | Mar. 14, 1950 |
| 2,536,139 | Ritter | June 2, 1951 |
| 2,557,231 | Miller | June 19, 1951 |
| 2,615,506 | Wilson | Oct. 28, 1952 |
| 2,616,487 | Parks | Nov. 4, 1952 |
| 2,618,320 | Deysher et al. | Nov. 18, 1952 |

FOREIGN PATENTS

| | | |
|---|---|---|
| 575,558 | Great Britain | Feb. 22, 1946 |